(12) United States Patent
Furui et al.

(10) Patent No.: US 7,034,851 B1
(45) Date of Patent: Apr. 25, 2006

(54) RECEIVER AND METHOD OF CONTROLLING GRAPHIC DISPLAY

(75) Inventors: Sunao Furui, Kanagawa (JP); Toshisada Ishii, Tokyo (JP); Naoki Murayama, Tokyo (JP); Tatsuya Wakahara, Tokyo (JP); Hidetaka Inada, Tokyo (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/601,940

(22) PCT Filed: Dec. 15, 1999

(86) PCT No.: PCT/JP99/07028

§ 371 (c)(1),
(2), (4) Date: Sep. 15, 2000

(87) PCT Pub. No.: WO00/36827

PCT Pub. Date: Jun. 22, 2000

(30) Foreign Application Priority Data

Dec. 15, 1998 (JP) .............................. P10/355942

(51) Int. Cl.
*G09G 5/00* (2006.01)

(52) U.S. Cl. .................... 345/660; 345/661; 725/49; 715/790; 348/569

(58) Field of Classification Search ............... 345/204, 345/214, 205, 33, 660, 661, 594, 1.2; 348/554, 348/555, 564, 567, 14.07, 569; 463/40, 39; 725/49, 117, 40, 43; 715/790, 791
See application file for complete search history.

(56) References Cited

U.S. PATENT DOCUMENTS

| 5,343,249 A | | 8/1994 | Moon |
| 5,696,500 A | * | 12/1997 | Diem ..................... 340/825.44 |
| 5,819,055 A | * | 10/1998 | MacLean et al. ........... 345/798 |
| 6,025,841 A | * | 2/2000 | Finkelstein et al. ......... 345/803 |
| 6,057,813 A | | 5/2000 | Matsumoto |

(Continued)

FOREIGN PATENT DOCUMENTS

EP 0765081 A2 3/1997

(Continued)

*Primary Examiner*—Amr A. Awad
*Assistant Examiner*—Abbas Abdulselam
(74) *Attorney, Agent, or Firm*—Lerner, David, Littenberg, Krumholz & Mentlik, LLP (57) ABSTRACT

The present invention is a multi-function receiver that controls a plurality of graphic user interface displays. The receiver includes a first display processing section for performing graphic display processing based on a program stored in a memory, a second display processing section for performing graphic display processing based on a control signal included in a signal for a channel being received, and a control section connected to the memory for controlling the first and second display processing sections. The control section performs control so to display a graphic screen display-processed by one of the first and second display processing sections. Thereby, the graphic screen display-processed by the first display processing section and the graphic screen display-processed by the second display processing section can be prevented from being overlapped and moreover, the conventional control program used in the first display processing section can be utilized as it is, without being changed.

26 Claims, 10 Drawing Sheets

1 RECEIVER

U.S. PATENT DOCUMENTS

| | | | | |
|---|---|---|---|---|
| 6,100,936 A | * | 8/2000 | Jordan et al. | 348/552 |
| 6,215,515 B1 | * | 4/2001 | Voois et al. | 348/14 |
| 6,230,322 B1 | * | 5/2001 | Saib et al. | 725/40 |
| 6,246,402 B1 | * | 6/2001 | Setogawa et al. | 345/723 |
| 6,285,362 B1 | * | 9/2001 | Kikuchi et al. | 345/329 |
| 6,285,407 B1 | * | 9/2001 | Yasuki et al. | 348/554 |
| 6,369,838 B1 | * | 4/2002 | Wallace et al. | 345/810 |
| 6,424,361 B1 | * | 7/2002 | Chapuis | 345/854 |
| 6,469,721 B1 | * | 10/2002 | Matthews et al. | 345/830 |
| 6,631,498 B1 | * | 10/2003 | McCauley et al. | 715/517 |

FOREIGN PATENT DOCUMENTS

| | | |
|---|---|---|
| GB | 2 339 104 A | 1/2000 |
| JP | 05-083653 | 4/1993 |
| JP | 07107408 A | 4/1995 |
| JP | 09-163347 | 6/1997 |
| JP | 10-257447 | 9/1998 |
| JP | 10-276372 | 10/1998 |
| JP | 10-276373 | 10/1998 |
| JP | 10-276377 | 10/1998 |
| JP | 10-276378 | 10/1998 |
| JP | 11-069251 | 3/1999 |
| JP | 11-298822 | 10/1999 |
| WO | WO98/37694 A1 | 8/1998 |
| WO | 98/44725 | 10/1998 |

* cited by examiner

RECEIVER AND METHOD OF CONTROLLING GRAPHIC DISPLAY

BACKGROUND OF THE INVENTION

The present invention relates generally to a reception display device and a reception display method for receiving digital broadcasts. More specifically, the invention relates to a receiver (IRD: integrated receiver decoder) for receiving and decoding digital broadcasts containing interactive user guides.

In digital broadcasting systems today, video data and audio data for a channel is compression-coded using an MPEG (Motion Picture Experts Group) algorithm and formed into packets, commonly referred to as a TS (transport stream) packet. TS packets for a plurality of channels are multiplexed to generate a transport stream and then transmitted as a digital broadcasting signal via a communication medium such as a cable or an air interface for wireless communication.

In a digital broadcasting system, a receiver extracts compressed video data and compressed audio data for a desired channel from the TS packets which are included in the transport stream received as a digital broadcasting signal, and decodes them to reproduce the video data and audio data.

Normally, in such a receiver, reproduced images are displayed on a monitor which is integrally provided or is connected with a cable.

The receiver typically has a function called a resident GUI (Graphical User Interface) and stores software for performing the display processing of the resident GUI in an internal memory as an application program. A CPU executes the software for the resident GUI in response to a user's operations. A graphic section controlled by this software generates a resident GUI screen and performs display processing so as to superimpose and display it on a program screen being received.

The resident GUI screen usually includes a display of the selected channel (a channel banner), a setting menu for the receiver, a list of favorite channels, an EPG (electronic program guide), and various messages for users.

In recent years, in addition to conventional video broadcasts, a variety of data broadcasting services, such as broadcasting music, game software, and the like, have been offered. Such a data broadcasting service is interactive, allowing a user to obtain desired information and to download music and game software by his operations.

An interactive program is a program which does not relate to and is independent of television programs. In the interactive program, a software program for displaying an operation screen (hereinafter, referred to as an interactive GUI) is also transmitted from a broadcasting station in addition to various data such as a motion picture, a still picture, a sound, or a letter, so that a user can perform various operations while watching a screen. Languages such as an MHEG (Multimedia and Hypermedia information coding Experts Group) and XML (extensible Markup Language) are used for the description of the software program for displaying this interactive GUI. A CPU of the receiver, receiving such an interactive program, reads a language such as MHEG and XML, to perform processing operations in accordance with the received program.

Figure 13:
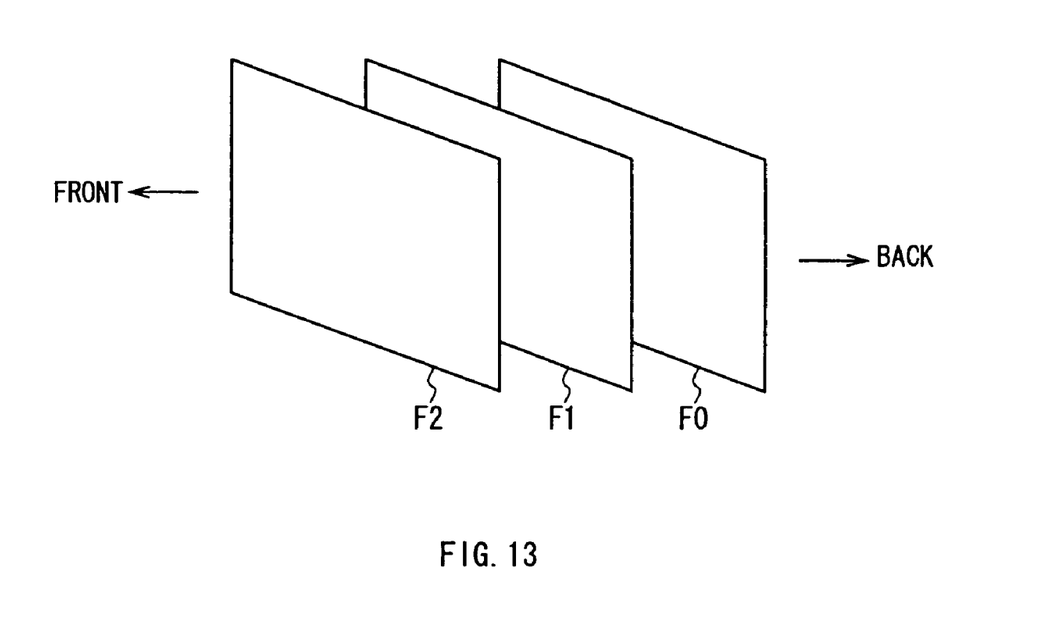
FIG. 13 is a schematic diagram explaining the conventional display of superimposing GUI screens.

The resident GUI screen and the interactive GUI screen may be displayed at the same time on the same monitor. As shown in FIG. 13, it is possible to display a screen having a resident GUI screen F1 superimposed on a program picture F0 and further, an interactive GUI screen F2 superimposed on them. It is also possible to display a screen having an interactive GUI screen superimposed on the program picture F0 and further, a resident GUI screen superimposed on them.

Such cases present a problem in that the front GUI can be seen but parts of the underlying GUI can not be seen where the resident GUI screen and the interactive GUI screen overlap. Setting menus of the resident GUI or operation buttons of the interactive GUI may be hidden and desired operations can not be performed.

One prior art method of solving such a problem changes a display position of the resident GUI to simultaneously display the resident GUI screen and the interactive GUI screen on the same monitor. However, new software must be developed for the resident GUI which must then take into account all interactive GUI formats and increases development time and cost.

SUMMARY OF THE INVENTION

The present invention has been made in view of the aforementioned problems, and is intended to provide a receiver and a method of controlling graphic display which solve the aforementioned problems.

The present invention provides a control section, a first display processing section for performing graphic display processing based on a program stored in a memory connected to the control section, under the control of the control section, and a second display processing section for performing graphic display processing based on a control signal included in a signal for a channel being received, under the control of the control section. The control section performs control so as to display a graphic screen display-processed by either first or second display processing section.

Further, according to the present invention, in a method of controlling graphic display of the receiver which provides the first display processing section for performing graphic display processing based on a program previously stored in a memory and the second display processing section for performing graphic display processing based on a control signal included in a signal for a channel being received, control is performed so as to display a graphic screen display-processed by either first or second display processing section.

As a result, it is possible to prevent a graphic screen display-processed by the first display processing section and a graphic screen display-processed by the second display processing section from being overlapped and moreover, to utilize a conventional control program for the first display processing section as it is.

BRIEF DESCRIPTION OF THE DRAWINGS

FIG. 6 is a schematic view explaining the display states at the time of turning power on.

FIG. 7 is a flowchart showing the operation of the CPU 6 at the time of turning power on.

DETAILED DESCRIPTION

An embodiment of the present invention will be hereinafter described with reference to the drawings.

(1) Construction of the Receiver

Figure 1:
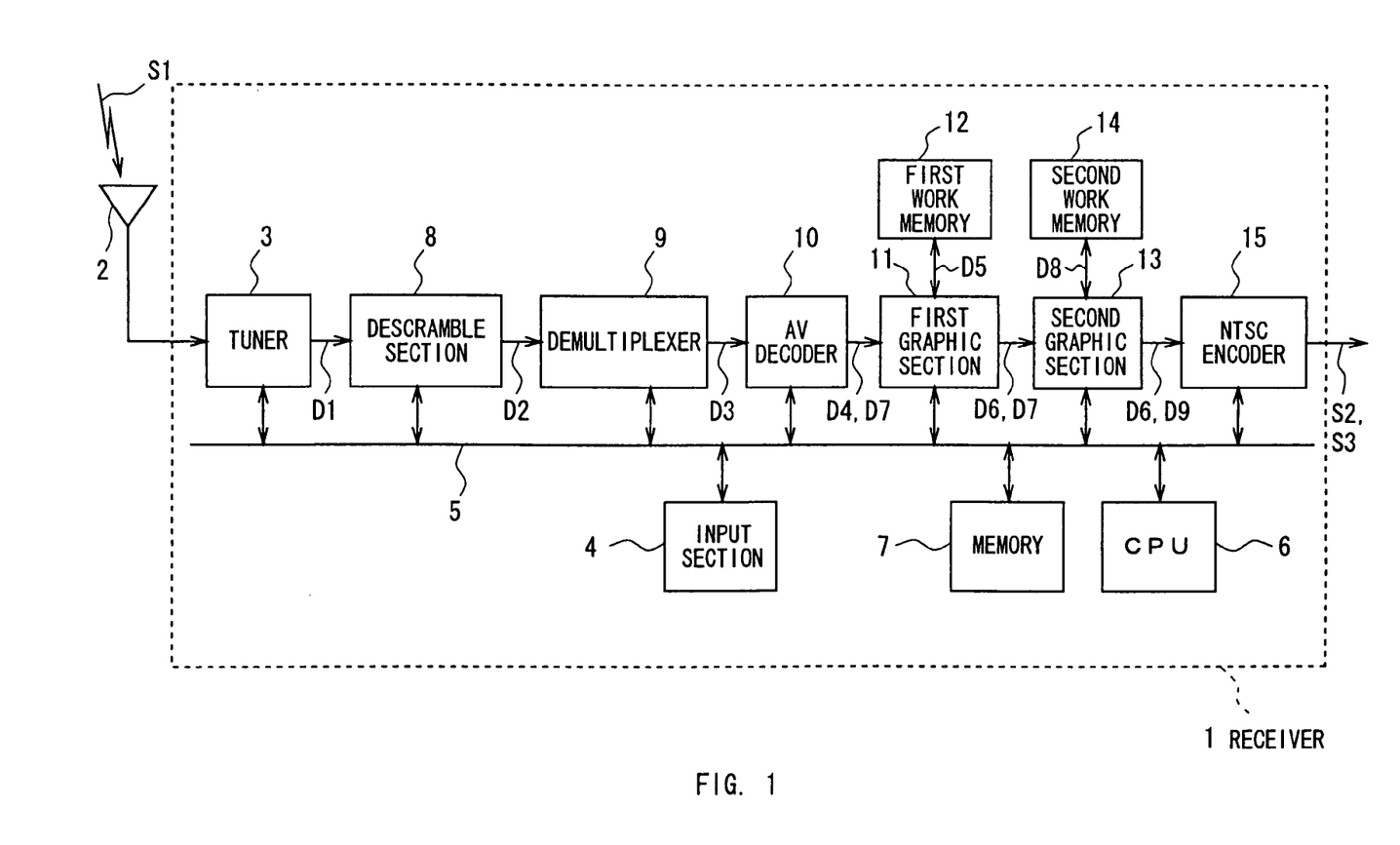
FIG. 1 is a block diagram showing the construction of a receiver according to the present invention.

In FIG. 1, numeral 1 shows a receiver to which the present invention is applied, and a digital broadcast S1 in which video data, audio data and the like for plural channels transmitted from broadcasting stations (not shown) are multiplexed, is received by a tuner 3 in the receiver 1 via an antenna 2.

In this receiver 1, an input section 4 (various buttons, an infrared sensor for a remote commander and so on) is connected to a CPU 6 with a bus 5 so that a user can control the CPU 6 with various commands such as a channel selection, with the input section 4. A memory 7 is connected to this CPU 6 with the bus 5. This memory stores software programs for performing various processing. The CPU 6 loads a software program from the memory 7 in response to the given command and executes it.

In this way, the CPU 6 selects a channel specified by the user and returns a transport stream D1 through demodulation by a prescribed method, by controlling the tuner 3 based on the command given by the user.

Then, a descramble section 8, receiving the enciphered (scrambled) transport stream D1, sequentially descrambles the scrambled transport stream and transmits the resultant transport stream D2 to a demultiplexer 9.

The demultiplexer 9 extracts TS packets D3 including video data and audio data for the channel specified by the user, from the transport stream D2, and transmits these to an audio/video (AV) decoder 10. In addition, the demultiplexer 9, when receiving TS packets including information necessary for the channel selection and a software program for performing display processing on an interactive GUI, extracts and transmits these to the CPU 6 through the bus 5.

The AV decoder 10 decodes the compressed video data and the compressed audio data included in the TS packets transmitted from the demultiplexer 9, to produce original video data D4 and audio data. The decoded video data D4 is transmitted to a first graphic section 11 and moreover, the decoded audio data is changed into an analog audio signal by a digital/analog converting circuit not shown and then transmitted to an external monitor or television through an audio cable.

The first graphic section 11 and a second graphic section 13 are circuits to respectively produce a resident GUI and an interactive GUI and superimpose the GUI screens on a video signal. If it is not necessary to display the GUI screens, the supplied video data is output as it is. Note that, the first graphic section 11 and the second graphic section 13 can be constructed as two function blocks or can be integrally constructed as one function block. In the case where they are constructed as one block, a first work memory and a second work memory are also integrally constructed as one block.

When a channel which is selected does not include an interactive program and a user directs that the number of the selected channel, a setting menu for the receiver, a list of favorite channels, or an EPG should be displayed, the first graphic section 11 produces the desired resident GUI under the control of the CPU 6. Further, the first graphic section 11 uses the first work memory 12 to superimpose the produced resident GUI onto the video data D4 supplied from the AV decoder 10, and transmits the first superimposed video data D6 to an NTSC (National Television System Committee) encoder 15 through the second graphic section 13 as it is.

The NTSC encoder 15 converts the supplied first superimposed video data D6 into an NTSC standard video signal, and outputs this signal to an external monitor or television as an analog video signal S2. In this way, the monitor or television displays pictures of broadcast based on the obtained analog video signal S2.

When a channel being selected includes an interactive program, the CPU 6 executes a software program for the display processing of the received interactive GUI and performs control so as to make the second graphic section 13 produce the interactive GUI screen. The second graphic section 13, under the control of the CPU 6, produces the interactive GUI, and superimposes the produced interactive GUI on the video data D7 supplied from the first graphic section 11 by using the second work memory 14, and then transmits the result to the NTSC encoder 15 as second superimposed video data D9.

The NTSC encoder 15 converts the given second superimposed video data D9 into an NTSC standard video signal and outputs this signal to the external monitor or television as an analog video signal S3. Thus, the monitor or the television displays the interactive GUI screen based on the obtained analog video signal S3.

Figure 2:
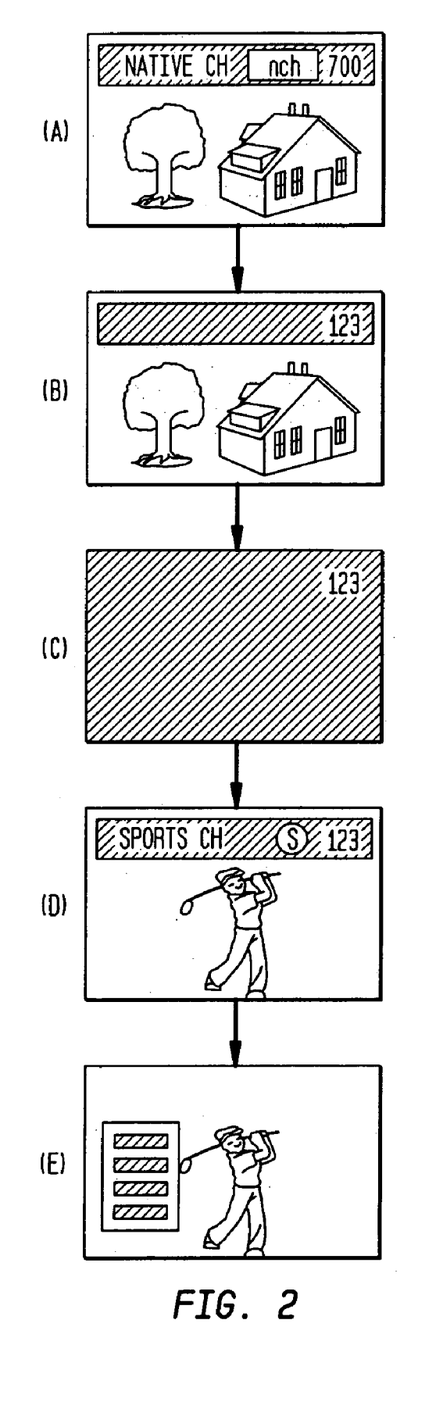
FIG. 2 is a schematic view explaining the switching of GUI screens when a program including an interactive program is selected.

(2) Display State on Screen of Monitor (2-1) Processing at the time of Switching Channels When a user directs that the number of the channel which is now selected is displayed as a resident GUI while the channel which does not include an interactive program is displayed, the display screen of the monitor shows the images of the broadcast based on the video data obtained from the received digital broadcast S1 and also shows the number of the channels superimposed at the upper side of the screen of the broadcast, as shown in FIG. 2(A). Note that, in the case of FIG. 2(A), not only the channel number "700" but also the name of the channel "NATIVE CH" and the logo of the channel "nch" are simultaneously displayed. The display of channel information is executed by the first graphic section 11. This information on a channel is referred to as a channel banner in the following description.

When the user intends to select another channel (for example, channel "123") with the input section 4 or the remote commander, the number of the channel input by manipulating the input section 4 or the remote commander is displayed at the position where the channel banner is displayed as shown in FIG. 2(B). This display processing is performed by the first graphic section 11.

During selection of a new desired channel, the whole screen of the monitor is changed to a mute screen which is, for example, only blue and the channel number to be selected "123" is displayed, as shown in FIG. 2(C). The display processing of the blue mute screen and the channel number is performed by the first graphic section 11. When finishing the channel selection, the mute screen is changed to the screen of the broadcast of the new selected channel and moreover, the channel banner is displayed at the upper side of the screen of the broadcast, as shown in FIG. 2(D). As the channel banner, the channel number "123", the name of the channel "SPORTS CH", and the logo of the channel "0" are displayed. The display processing of this channel banner is performed by the first graphic section 11.

When the selected channel "123" is a channel including an interactive program, the resident GUI screen (channel banner) which has been displayed is deleted and the interactive GUI screen is superimposed and displayed on the screen of the broadcast instead, as shown in FIG. 2(E). The display processing of the interactive GUI screen is performed by the second graphic section 13. Note that four operation buttons are displayed as the interactive GUI screen shown in FIG. 2(E), as an example.

Figure 3:
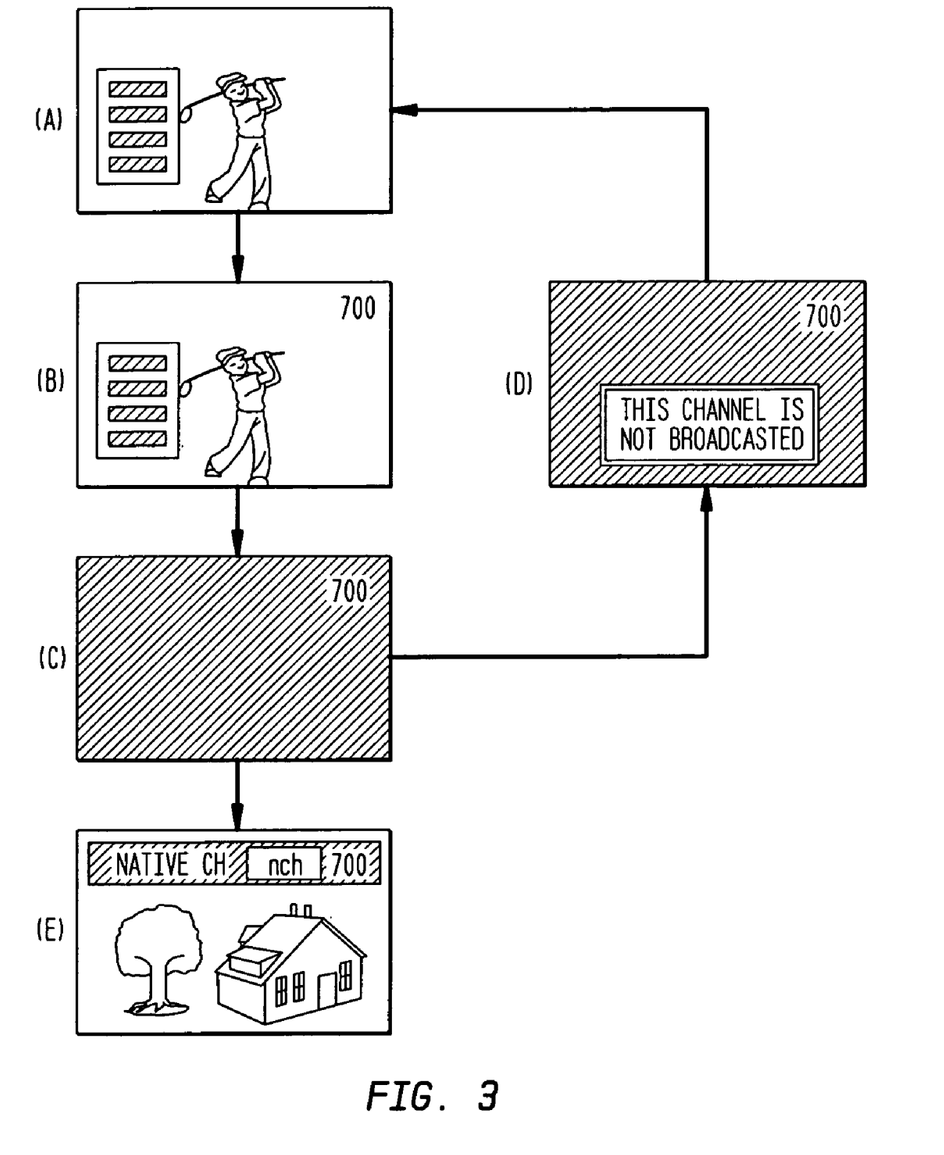
FIG. 3 is a schematic view explaining the switching of GUI screens when a program not including the interactive program is selected.

On the other hand, while a channel including the interactive program is now selected, the interactive GUI screen is superimposed and displayed on the screen of the broadcast based on the video data obtained from the received digital broadcast S1 on the display screen of the monitor, as shown in FIG. 3(A). This display processing of the interactive GUI screen is performed by the second graphic section 13.

Then, when the user inputs the number of another channel by manipulating the input section 4 or the remote commander, the number of the input channel is displayed as shown in FIG. 3(B). The display of the channel number is performed by the second graphic section 13. In general, the second graphic section 13 is controlled by the CPU 6 which reads a software program for displaying the interactive GUI which is transmitted from a broadcasting station. However, only when an order to change channels is made while the interactive GUI is displayed does the second graphic section 13 act for performing the display processing of the resident GUI, irrespective of the software program for the display processing of the interactive GUI transmitted from the broadcasting station. And during selection of the new ordered channel, the interactive GUI screen and the screen of the broadcast which have been displayed are deleted and changed to the mute screen which is, for example, only blue and the channel number to be selected "700" is displayed, as shown in FIG. 3(C). This display processing of the blue mute screen and the channel number is performed by the first graphic section 11.

If the selected channel is not broadcasted now, a message "this channel is not broadcasted" is shown on the display screen of the monitor, as shown in FIG. 3(D). The display processing of this message is performed by the first graphic section 11.

On the other hand, when finishing the selection of the new channel, the mute screen is deleted, and the screen of the broadcast based on the video data obtained from the digital broadcast S1 is displayed and the channel banner is superimposed and displayed on the screen of the broadcast as shown in FIG. 3(E). The display processing of this channel banner is performed by the first graphic section 11.

Figure 4:
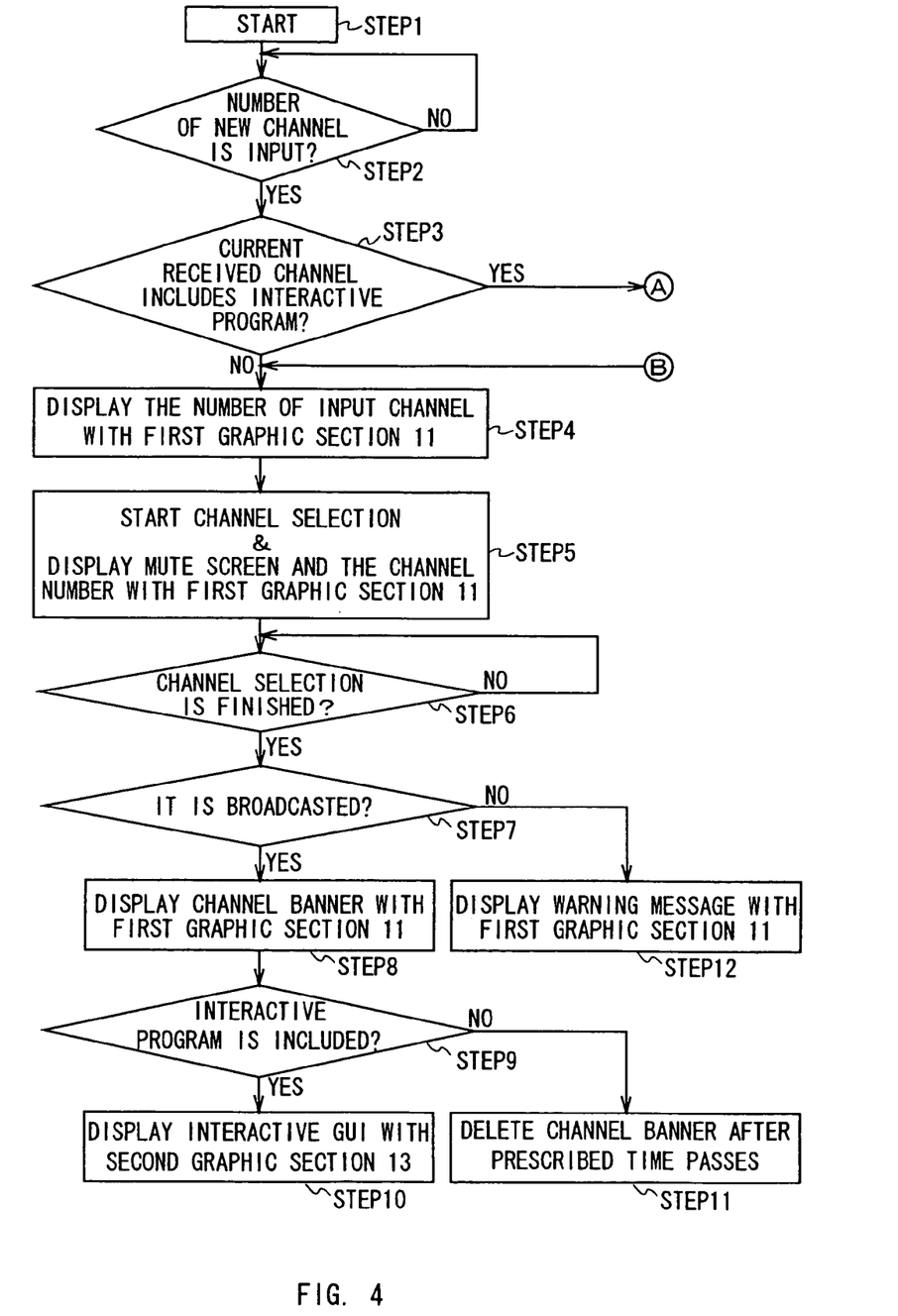
FIG. 4 is a flowchart showing an operation of a CPU 6 at the time of switching channels.
Figure 5:
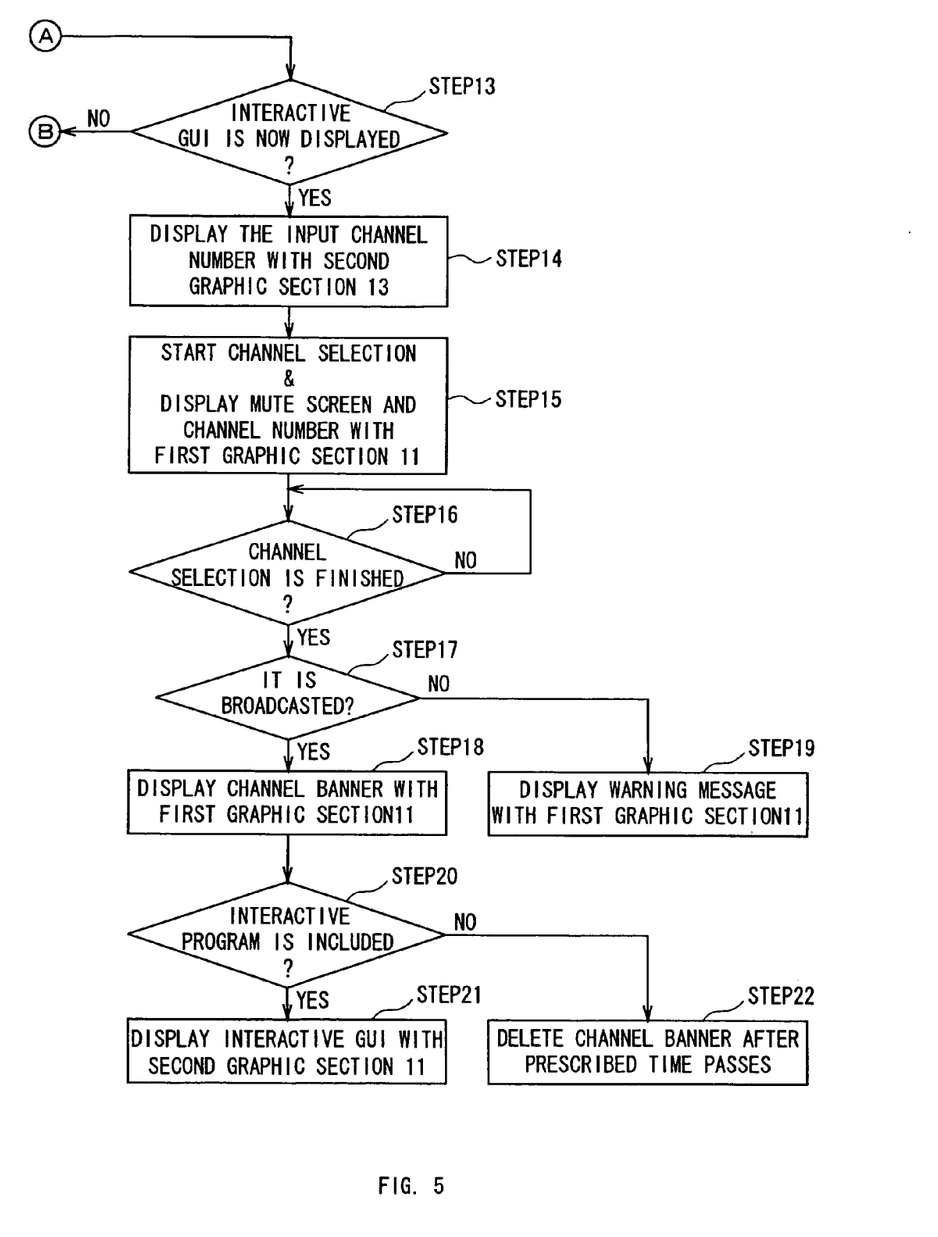
FIG. 5 is a flowchart showing an operation of a CPU 6 at the time of switching channels.

FIG. 4 and FIG. 5 are flowcharts showing the processing of the CPU 6 at the time of switching channels shown in FIG. 2 and FIG. 3.

In FIG. 4, the processing starts in step 1, and in step 2 it is repeatedly judged whether an order to select a new channel has been made. When it is judged that the order to select a new channel has been made, the processing proceeds to step 3 to judge whether the channel which has been received includes an interactive program. When the channel being received does not include the interactive program, the processing proceeds to step 4 to control the first graphic section 11 so as to display the number of the new ordered channel. Then, in step 5, the tuner 3 is controlled to start the selection operation, and the first graphic section 11 is controlled to perform the display processing of the mute screen and the channel number. It is judged in step 6 whether the channel selection has been finished. When it is judged that the channel selection has been finished, the processing proceeds to step 7 to judge whether the new selected channel is broadcasted. When it is judged that the new selected channel is broadcasted, the processing proceeds to step 8 to make the first graphic section 11 display the channel banner under control. Then, the processing proceeds to step 9 to judge whether the new selected channel includes the interactive program. When the interactive program is detected, the processing proceeds to step 10 to make the second graphic section 13 perform the display processing of the interactive GUI under control. When the interactive program is not detected and it is judged in step 11 that the prescribed time has passed, the first graphic section 11 is controlled to cancel the display of the channel banner. Further, when it is judged in step 7 that the new selected channel is not broadcasted, the processing proceeds to step 12 to make the first graphic section 11 display a message indicating that the channel is not broadcasted, under control.

Further, when it is judged in step 3 that the channel being received includes the interactive program, the processing proceeds to step 13 in FIG. 5 to judge whether the interactive GUI has been displayed. If the interactive GUI has not been displayed, the processing proceeds to step 4 and the following steps in FIG. 4. On the other hand, if the interactive GUI has been displayed, the processing proceeds to step 14 in FIG. 5 to perform the display processing of the number of the new selected channel by the second graphic section 13. After that, the selection operation is started by controlling the tuner 3 in step 15 and the display processing of the mute screen and the channel number is performed by controlling the first graphic section 11. Then, in step 16, it is judged whether the channel selection has been finished. If it is judged that the channel selection has been finished, the processing proceeds to step 17 to judge whether the new selected channel is broadcasted. When it is judged that the new selected channel is broadcasted, the processing proceeds to step 18 to make the first graphic section 11 display the channel banner under control. After that, the processing proceeds to step 20 to judge whether the new selected channel includes the interactive program. When the interactive program is detected, the processing proceeds to step 21 to make the second graphic section 13 display the interactive GUI under control. When the interactive program is not detected and it is judged in step 22 that the prescribed time has passed, the first graphic section 11 is controlled to cancel the display of the channel banner. Further, when it is judged in step 17 that the new selected channel is not broadcasted, the processing proceeds to step 19 to make the first graphic section 11 display a message indicating that the channel is not broadcasted, under control.

(2-2) Display State at the Time of Turning Power on

Next, the processing at the time of turning power on by manipulating the input section 4 by a user will be described.

Figure 6:
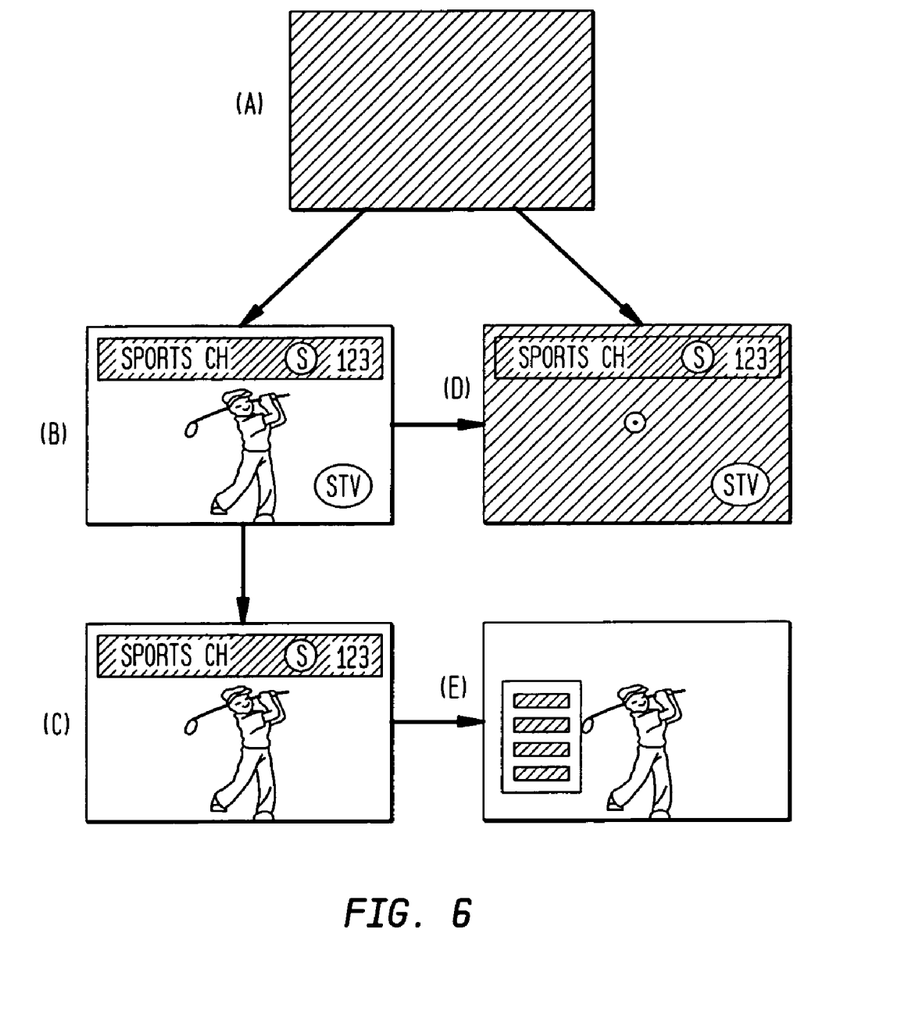

When the power is turned on, the display screen of the monitor is changed from the no-displaying state shown in FIG. 6(A) to the state where the channel which was selected at the last power-off is displayed.

When the interactive program is not detected in the selected channel of this time, the images of the broadcast based on the video data obtained from the received digital broadcasting S1 are normally displayed and the channel banner and the network logo "STV" are also displayed. The display processing of the channel banner and the network logo is performed by the graphic section 11.

Then, after about three minutes passes, only the network logo is deleted and only the channel banner is superimposed and displayed on the screen of the broadcast, as shown in FIG. 6(C). The display processing of the channel banner is performed by the first graphic section 11.

On the other hand, when it is detected that the selected channel is a channel including the interactive program, the display screen of the monitor becomes a mute screen which is, for example, only gray and moreover, the channel banner and the network logo are superimposed and displayed, as shown in FIG. 6(D). Here, the display processing of the mute screen, the channel banner, and the network logo is performed by the first graphic section 11.

Then, after three minutes passes, the channel banner and the network logo are deleted from the display screen of the monitor and the images of the broadcast and the interactive GUI are displayed, as shown in FIG. 6(E). The display processing of the interactive GUI is performed by the second graphic section 13.

Further, in the state shown in FIG. 6(B) or in FIG. 6(C), when it is detected that the selected channel is a channel including the interactive program, the display screen of the monitor is changed to the display screen shown in FIG. 6(D) or in FIG. 6(E), respectively. That is, when the interactive program is detected in the state shown in FIG. 6(B), the first graphic section 11 performs the display processing of generating a gray mute screen and superimposing the channel banner and the network logo on this mute screen. On the other hand, when the interactive program is detected in the state shown in FIG. 6(C), the first graphic section 11 finishes the display processing of the channel banner and the second graphic section 13 newly performs the display processing of the interactive GUI.

Figure 7:
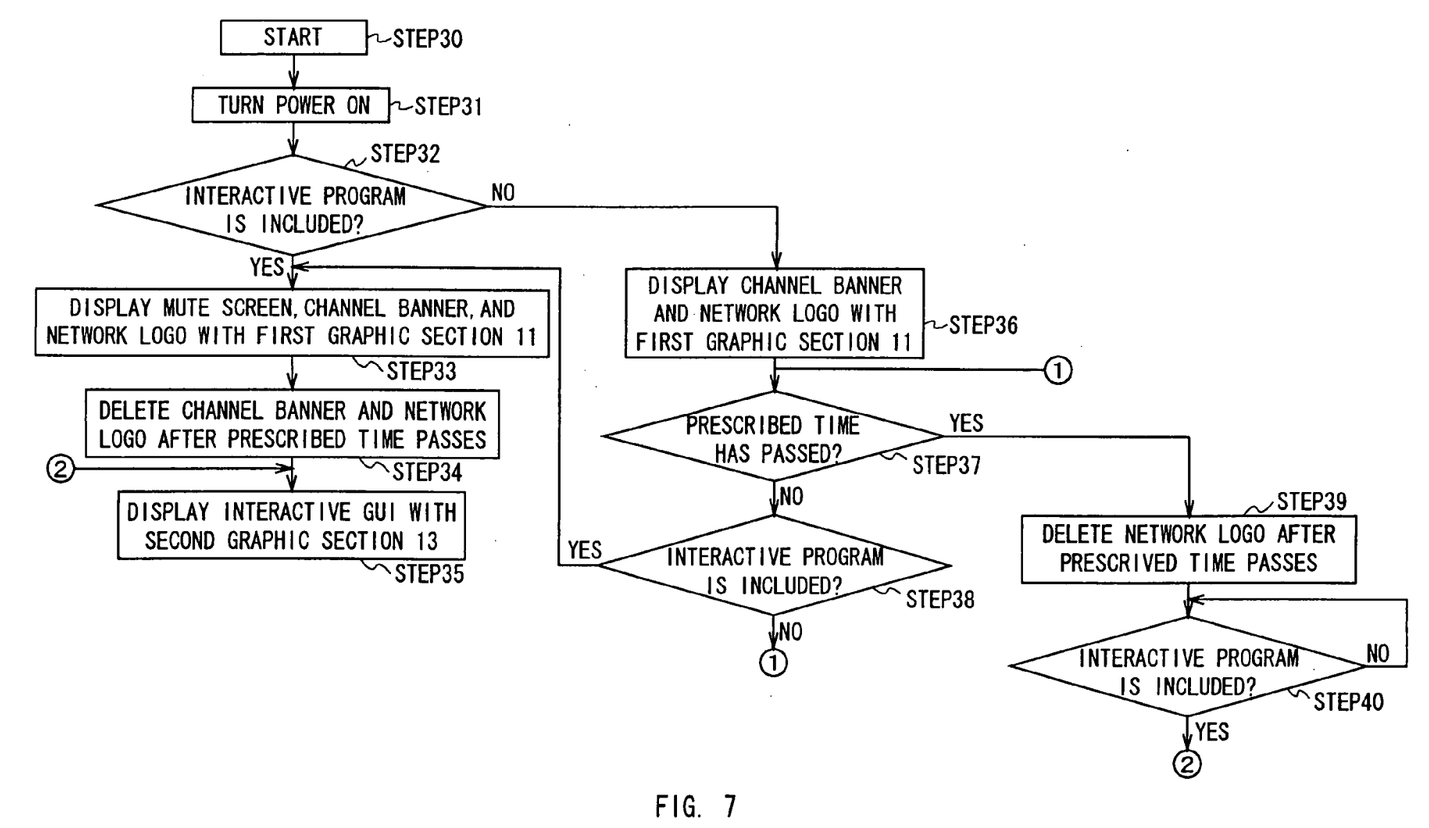

FIG. 7 is a flowchart showing the processing of the CPU 6 at the time of turning power on shown in FIG. 6.

At first, the processing starts in step 30, and in step 31, it is detected that the power is turned on. The processing proceeds to step 32, where it is judged whether the selected channel includes the interactive program. When it is judged the interactive program is included, the processing proceeds to step 33 to make the first graphic section 11 display the mute screen, the channel banner, and the network logo on the screen under control. Then, after the prescribed time (for example, three minutes) passes, the first graphic section 11 is controlled to delete the channel banner and the network logo. And in step 35, the second graphic section 13 is controlled to display the interactive GUI.

On the other hand, in step 32, when it is detected that the interactive program is not included, the processing proceeds to step 36 to make the first graphic section display the channel banner and the network logo under control. Then, it is judged in step 37 whether the prescribed time has passed. When it has not passed, it is judged in step 38 whether the interactive program is detected. And when the interactive program is detected, the processing proceeds to step 33 and the following steps which were described. On the other hand, when the interactive program is not detected, the processing returns to step 37. Then, when it is judged in step 37 that the prescribed time has passed, the processing proceeds to step 39 to delete the network logo and it is repeatedly judged in step 40 whether the interactive program is detected. When the interactive program is detected in step 40, the processing proceeds to step 35 to make the second graphic section 13 display the interactive GUI under control.

The reason the detection of the interactive program is performed in step 38 and step 40 though it is performed in step 32 in FIG. 7 is because the time is required for the detection of the interactive program.

(2-3) Processing for the Case Where an Order to Display a List of Favorite Channels or Resident GUI such as EPG is made during Interactive GUI is Displayed Next, the processing for the case where an order to display a list of favorite channels or resident GUI such as EPG is made during an interactive GUI is displayed will be described.

Figure 8:
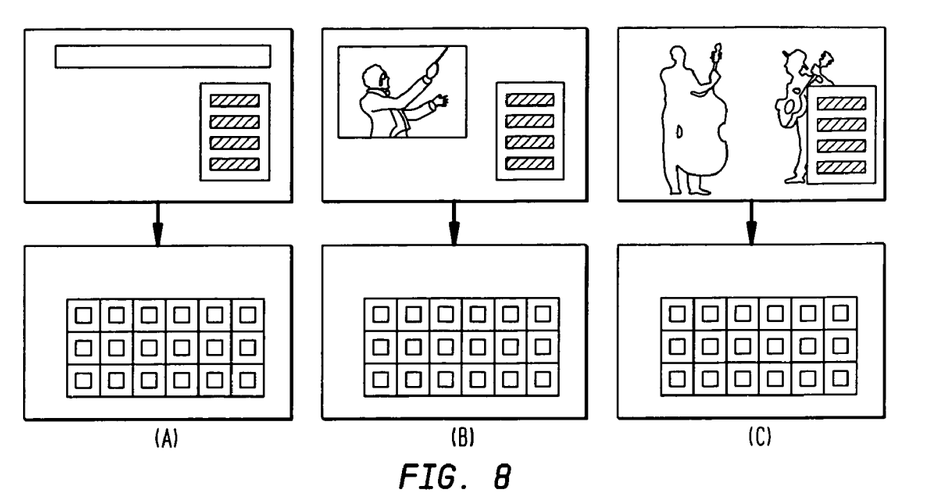
FIG. 8 is a schematic view explaining a switching display when a resident GUI screen is selected during the display of an interactive GUI screen.

FIG. 8(A) shows an example of changing the screen from the state where no pictures are displayed and the interactive GUI screen display-processed by the second graphic section 13 is displayed on the whole display screen of the monitor, to the state where a resident GUI screen such as favorite channels or EPG is displayed.

In this case, the background is, for example, only gray, and the list of favorite channels or EPG desired is superimposed and displayed. This list of favorite channels and EPG are display-processed by the first graphic section 11.

FIG. 8(B) shows an example of changing the screen from the state where a picture is displayed in a part of the screen and the interactive GUI screen is displayed in another part, to the state where the resident GUI screen such as favorite channels is displayed.

In this case, similarly to FIG. 8(A), the background is, for example, only gray, and the list of favorite channels or the EPG desired is superimposed and displayed. The list of favorite channels and EPG are display-processed by the first graphic section 11. If it is considered that the sudden deletion of the picture which is displayed in a part of the screen, at the time of ordering to display the list of favorite channels or the EPG is unnatural, the picture, which is displayed in a part of the screen, may be displayed on the whole screen and the ordered list of favorite channels or EPG may be superimposed and displayed.

FIG. 8(C) shows an example of changing the screen from the state where a picture is displayed on the whole screen and the interactive GUI is superimposed and displayed on the picture, to the state where the resident GUI such as favorite channels is displayed.

In this case, similarly to FIGS. 8(A) and 8(B), the background is, for example, only gray and a list of favorite channels or the EPG desired is superimposed and displayed. The list of favorite channels and EPG are display-processed by the first graphic section 11. Note that, also in this case, if it is considered that the sudden deletion of the picture at the time of ordering to display a list of favorite channels or the EPG is unnatural, the ordered list of favorite channels or EPG may be superimposed and displayed on the picture.

In this way, when an order to display the list of favorite channels or EPG is made during the interactive GUI is displayed with the second graphic section 13, the display processing by the second graphic section 13 is cancelled, and the display processing by the first graphic section 11 is started.

Figure 9:
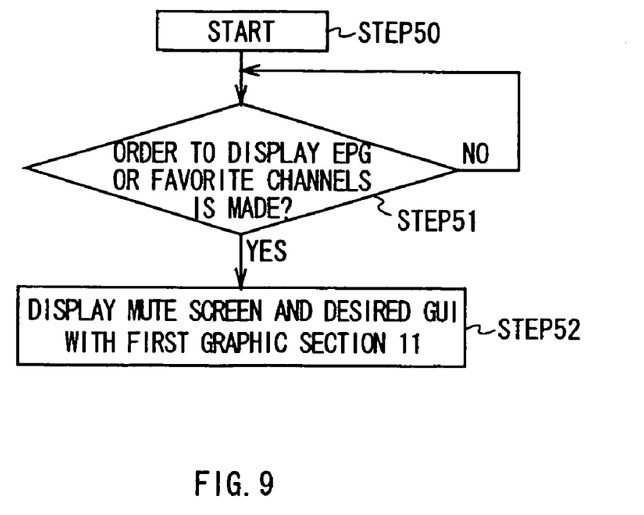
FIG. 9 is a flowchart showing an operation of the CPU 6 when a resident GUI screen is selected during the display of an interactive GUI screen.

FIG. 9 is a flowchart showing the processing of the CPU6 in the case shown in FIG. 8 where an order to display a list of favorite channels or an EPG is made during the interactive GUI is displayed.

First, the processing starts in step 50 and it is judged in step S1 whether a user orders to display an EPG or a list of favorite channels. When it is judged that the order to display the EPG or the list of favorite channels has been made, the processing proceeds to step S2 to finish the display processing of the second graphic section 13, and to make the first graphic section 11 display a mute screen and also display the ordered GUI (EPG or a list of favorite channels) under control.

(2-4) Display processing when a warning message is required when the Interactive GUI is Displayed.

Next, the processing for the case where the display of a message indicating such warning is required when the interactive GUI is displayed will be described.

Figure 10:
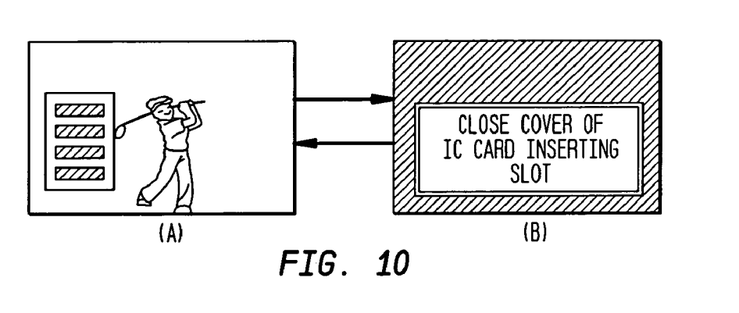
FIG. 10 is a schematic view explaining the case where a message has to be displayed during the display of the interactive GUI screen.

FIG. 10(A) shows a warning message being displayed, for example, where the cover of an IC card inserting slot is being opened. If an interactive GUI screen is displayed on the monitor, the interactive GUI screen is deleted and a message "close the cover of IC card inserting slot" is superimposed and displayed on, for example, the gray background screen instead, as shown in FIG. 10(B). This message is display-processed by the first graphic section 11. Note that, though a mute screen is displayed and a message is displayed in FIG. 10, the message may be superimposed and displayed on the picture. Further, when the cover of the IC card inserting slot is closed, the screen is returned to the picture (FIG. 10(A)).

Figure 11:
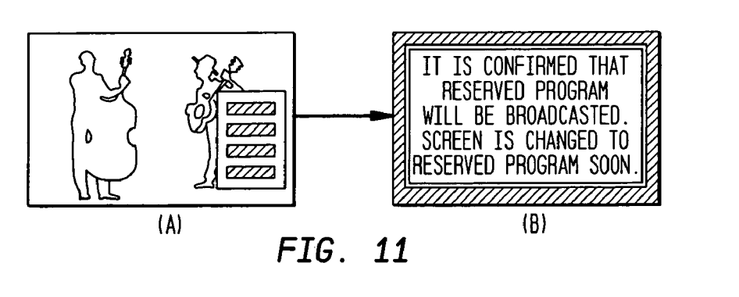
FIG. 11 is a schematic view explaining the case where a message has to be displayed during the display of the interactive GUI screen.

Further, as shown in FIG. 11(A), when a reserved setting time tolls and an interactive GUI screen is displayed on the monitor, a message, for example, "It is confirmed that reserved program will be broadcasted. Screen is changed to reserved program soon." is superimposed and displayed on the background screen which is, for example, only gray (FIG. 11(B)). This message is also display-processed by the first graphic section 11.

Figure 12:
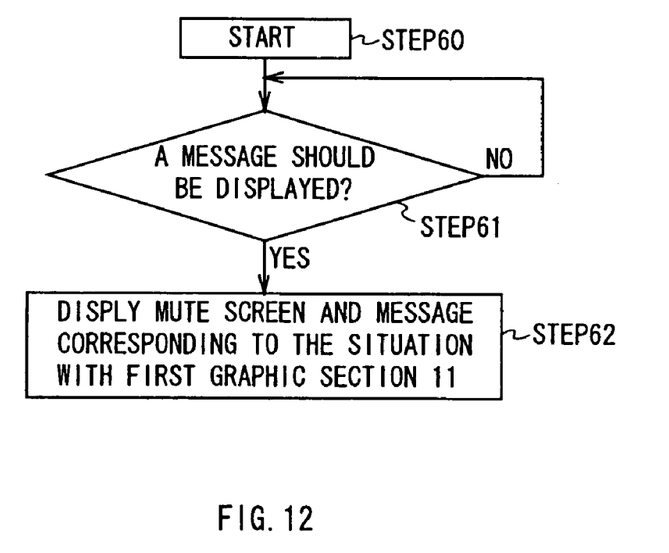
FIG. 12 is a flowchart showing the processing of the CPU 6 at the time when a message has to be displayed during the display of the interactive GUI screen.

FIG. 12 is a flowchart showing the processing of the CPU 6 for the case where the display of a message such as warning is required when an interactive GUI is displayed.

At first, the processing is started in step 60, and in step 61, it is judged whether any messages should be displayed. When it is detected that a message should be displayed, the processing proceeds to step 62 to finish the display processing by the second graphic section 13, and to make the first graphic section 11 display a mute screen and also display a message corresponding to the occurred situation under control.

As described above, according to the present invention, either the resident GUI screen display-processed by the first graphic section 11 or the interactive GUI screen produced by the second graphic section for processing program software included in the received channel is exclusively superimposed and displayed on the images of the broadcast, therefore the resident GUI screen can be prevented from being hidden by the interactive GUI screen.

Further, in the case where an order to select a new channel is made under the state where the interactive GUI screen is displayed by the second graphic section 13, the second graphic section 13 performs the display processing of the number of the new channel which is a resident GUI. Thereby, the conventional application program of the first graphic section 11 can be utilized as it is, without changing its setting.

The invention claimed is:

1. A receiver, comprising:
   a memory having a program stored therein;
   a first display processing section for performing graphic display processing in accordance with a first graphic user interface (GUI) based on said program;
   a receiving section for receiving a signal for a channel, said signal including display control data written in a multimedia language and associated with an interactive content;
   a second display processing section for performing graphic display processing in accordance with a second GUI based on said display control data; and
   a control section for controlling said first and second display processing sections so as to always display on the same display a screen processed by one of said first and second display processing sections;
   wherein when said control section is instructed to display a screen in accordance with said first GUI while displaying a screen in accordance with said second GUI on said same display, said control section terminates the performance of graphic display processing by said second display processing section to prevent undesired overlapping of said first and second GUIs.

2. The receiver according to claim 1, wherein said first display processing section executes said graphic display processing in accordance with said first GUI in response to a channel selection made by a user.

3. The receiver according to claim 2, wherein, when said control signal is included in said selected channel, after a prescribed time passes, said second display processing section executes graphic display processing in accordance with said second GUI based on said control signal in place of said graphic display processing by said first display processing section.

4. The receiver according to claim 1, wherein said first display processing section executes said graphic display processing in accordance with said first GUI in response to a channel information display order made by a user.

5. The receiver according to claim 1, wherein when said control section detects a condition of the receiver, said control section controls said first and second display processing sections so that only said first display processing section executes said graphic display processing.

6. The receiver according to claim 1, wherein, when a channel selection is received while said second display processing section performs graphic display processing, said second display processing section performs graphic display processing of information relating to said selected channel.

7. The receiver according to claim 1, wherein, at a time power to the receiver is turned on, said first display processing section executes graphic display processing of information relating to a selected channel.

8. The receiver according to claim 7, wherein, when said control signal is included in said selected channel, said second display processing section subsequently executes graphic display processing based on said control signal in place of said graphic display processing by said first display processing section.

9. The receiver according to claim 1, wherein, when a channel information display order is received while said second display processing section performs graphic display processing, said first display processing section executes graphic display processing corresponding to said channel information display order in place of said graphic display processing by said second display processing section.

10. The receiver according to claim 9, wherein said channel information display order is an order to display a list of electronic programs.

11. The receiver according to claim 9, wherein said channel information display order is an order to display a list of a user's favorite channels.

12. The receiver according to claim 1, wherein, when a condition is detected while said second display processing section performs graphic display processing, said first display processing section executes graphic display processing corresponding to said detected condition in place of said graphic display processing by said second display processing section.

13. A method of controlling a graphic display for a receiver, comprising:
providing a first graphic display in accordance with a first graphic user interface (GUI) based on a program stored in a memory;
receiving a signal for a channel, said signal including display control data written in a multimedia language and associated with an interactive content;
providing a second graphic display in accordance with a second GUI based on said display control data; and
controlling a display such that one of said first and second graphic displays is always displayed on the same display;
wherein when said controlling step decides to display said first graphics display while said second graphics display is currently displayed on said same display, said controlling step terminates said step of providing said second graphics display to prevent undesired overlap of said first and second GUIs.

14. The method of controlling a graphic display according to claim 13, further comprising:
receiving a channel selection from a user; and wherein said step of providing said first graphic display is performed in response to said received channel selection.

15. The method of controlling a graphic display according to claim 14, further comprising:
detecting whether said selected channel includes said control signal; and
wherein, if said control signal is detected, said controlling step provides said second graphic display based on said control signal in place of said first graphic display after a prescribed time passes.

16. The method of controlling a graphic display according to claim 13, further comprising:
receiving a channel information display order from a user; and wherein said step of providing said first graphic display is performed in response to said received channel information display order.

17. The method of controlling a graphic display according to claim 13, further comprising:
detecting a condition of said receiver; and
wherein said step of providing said first graphic display is performed in response to said detected condition.

18. The method of controlling a graphic display according to claim 13, wherein, when a channel selection is received when displaying said second graphic display, said step of providing said second graphic display includes processing information relating to said selected channel.

19. The method of controlling a graphic display according to claim 13, wherein, at a time of turning power on to the receiver, said step of providing said first graphic display includes processing information relating to a selected channel.

20. The method of controlling a graphic display according to claim 19, wherein, when said control signal is included in said selected channel while displaying said first graphic display, said controlling step subsequently displays said second graphic display based on said control signal in place of said first graphic display.

21. The method of controlling a graphic display according to claim 13, wherein, when a channel information display order is received while displaying said second graphic display, said controlling step displays said first graphic display corresponding to said channel information display order in place of said second graphic display.

22. The method of controlling a graphic display according to claim 21, wherein said channel information display order is an order to display a list of electronic programs.

23. The method of controlling a graphic display according to claim 21, wherein said channel information display order is an order to display a list of a user's favorite channels.

24. The method of controlling a graphic display according to claim 13, wherein, when a condition is detected while displaying said second graphic display, said controlling step displays said first graphic display corresponding to said detected condition in place of said second graphic display.

25. An interactive television receiver, comprising:
a memory having a control program stored therein:
a first display processor for performing graphic display processing in accordance with a first graphic user interface (GUI) based on said control program:
a television tuner for receiving a television signal, said television signal including interactive contents which are written in a multimedia language;
a second display processor for performing graphic display processing in accordance with a second GUI based on said interactive contents: and
a controller for controlling said first and second display processors so as not to overlap, on the same display, by terminating processing in accordance with said second GUI, GUIs processed by said first an second display processors.

26. The interactive television receiver according to claim 25, wherein said multimedia language is XML.

* * * * *

UNITED STATES PATENT AND TRADEMARK OFFICE
CERTIFICATE OF CORRECTION

| | |
|---|---|
| PATENT NO. | : 7,034,851 B1 |
| APPLICATION NO. | : 09/601940 |
| DATED | : April 25, 2006 |
| INVENTOR(S) | : Sunao Furui et al. |

It is certified that error appears in the above-identified patent and that said Letters Patent is hereby corrected as shown below:

Column 1, line 13, "channel is" should read --channel are--
Column 12, line 51, "first an second" should read --first and second--

Signed and Sealed this

Twenty-second Day of August, 2006

JON W. DUDAS
*Director of the United States Patent and Trademark Office*